United States Patent
Ujita

(10) Patent No.: US 10,486,624 B2
(45) Date of Patent: *Nov. 26, 2019

(54) PROTECTOR

(71) Applicant: SUMITOMO WIRING SYSTEMS, LTD, Mie (JP)

(72) Inventor: Satoshi Ujita, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,850

(22) Filed: Dec. 28, 2018

(65) Prior Publication Data

US 2019/0135203 A1    May 9, 2019

Related U.S. Application Data

(63) Continuation of application No. 15/775,587, filed as application No. PCT/JP2016/082014 on Oct. 28, 2016, now Pat. No. 10,196,016.

(30) Foreign Application Priority Data

Nov. 18, 2015  (JP) .................................. 2015-225891

(51) Int. Cl.
*B60R 16/023* (2006.01)
*B60R 16/02* (2006.01)
(Continued)

(52) U.S. Cl.
CPC ........ *B60R 16/0215* (2013.01); *F16B 5/0012* (2013.01); *F16B 5/06* (2013.01);
(Continued)

(58) Field of Classification Search
CPC combination set(s) only.
See application file for complete search history.

(56) References Cited

U.S. PATENT DOCUMENTS 4,891,471 A * 1/1990 Ono ..................... H02G 3/0418
138/166
4,951,716 A * 8/1990 Tsunoda .............. H02G 3/0418
138/157
(Continued)

FOREIGN PATENT DOCUMENTS

JP    08-296621    11/1996
JP    09-210024    8/1997
(Continued)

OTHER PUBLICATIONS

Official Communication issued in International Bureau of WIPO Patent Application No. PCT/JP2016/082014, dated Nov. 29, 2016.

*Primary Examiner* — William H. Mayo, III
*Assistant Examiner* — Krystal Robinson
(74) *Attorney, Agent, or Firm* — Greenblum & Bernstein, P.L.C.

(57) ABSTRACT

A protector includes a protector main body having a bottom wall and two side walls. The protector main body forms a depression and a lid member closes off an open end of the depression. The lid member includes a male lock portion having an elastic tab with an engagement claw. The protector main body includes a female lock portion having a frame on at least one side wall of the two side walls and the frame engaging with the engagement claw. A projecting-end-proximate top end surface of the frame of the female lock portion is positioned further upward than the pair of base-end-proximate top end surfaces and the top end surface of the side wall of the protector main body. Further, the projecting-end-proximate top end surface and an engagement projection portion of the frame of the female lock portion moves away from the one side wall on a top end side while approaching the one side wall on a bottom end side.

1 Claim, 3 Drawing Sheets

(51) Int. Cl.
*F16B 5/06* (2006.01)
*F16B 5/00* (2006.01)
*H02G 3/04* (2006.01)
*F16B 5/07* (2006.01)

(52) U.S. Cl.
CPC ............ *F16B 5/07* (2013.01); *H02G 3/0406* (2013.01); *H02G 3/0418* (2013.01); *F16B 5/0664* (2013.01)

(56) References Cited

U.S. PATENT DOCUMENTS

| | | | | |
|---|---|---|---|---|
| 5,016,842 | A * | 5/1991 | Suzuki | B60R 16/0215 248/68.1 |
| 5,332,866 | A * | 7/1994 | Sawamura | H02G 3/0608 138/166 |
| 5,531,345 | A * | 7/1996 | Nakamura | H02G 3/088 220/3.8 |
| 5,556,059 | A * | 9/1996 | Maeda | B60R 16/0215 174/69 |
| 5,597,980 | A * | 1/1997 | Weber | H02G 3/0418 123/143 C |
| 5,779,952 | A * | 7/1998 | Matsumoto | B29C 44/0415 264/328.12 |
| 5,962,814 | A * | 10/1999 | Skipworth | B60R 16/0215 174/135 |
| 6,087,593 | A * | 7/2000 | Skipworth | B60R 16/0215 174/135 |
| 6,476,327 | B1 * | 11/2002 | Bernard | H02G 3/045 174/101 |
| 7,214,879 | B1 * | 5/2007 | Suzuki | B60R 16/0215 174/68.3 |
| D750,032 | S * | 2/2016 | Suenaga | D13/156 |
| 2003/0173102 | A1 * | 9/2003 | Kishizawa | H02G 3/0481 174/68.1 |
| 2005/0004433 | A1 * | 1/2005 | Hirata | A61B 1/0055 600/152 |
| 2005/0241715 | A1 * | 11/2005 | Suzuki | B60R 16/0215 138/110 |
| 2006/0090916 | A1 * | 5/2006 | Suzuki | H02G 3/0691 174/481 |
| 2009/0211781 | A1 * | 8/2009 | Suzuki | B60R 16/0215 174/101 |
| 2009/0221160 | A1 * | 9/2009 | Taniguchi | H02G 3/083 439/76.2 |
| 2010/0025077 | A1 * | 2/2010 | Ujita | B60R 16/0222 174/153 G |

FOREIGN PATENT DOCUMENTS

| | | |
|---|---|---|
| JP | 2005-137154 | 5/2005 |
| JP | 2012-167736 | 9/2012 |
| JP | 2014187826 A * | 10/2014 |
| JP | 2015-188294 | 10/2015 |

* cited by examiner

PROTECTOR

This is a continuation application of U.S. patent application Ser. No. 15/775,587 filed May 11, 2018, which is a National Stage of PCT/JP2016/082014 filed Oct. 28, 2016, which claims the benefit of Japanese Patent Application No. 2015-225891, filed Nov. 18, 2015. The entire disclosure of each of the above-identified applications, including the specification, drawings, and claims, is incorporated herein by reference in its entirety.

FIELD OF THE INVENTION

The present invention relates to a protector that protects a wire harness, and particularly relates to a protector configured such that a lid member engages with a protector main body having a depression that accommodates a wire.

BACKGROUND OF THE INVENTION

When manufacturing a wire harness to be mounted in a vehicle, a portion of a routing section of the wire harness is often protected by enclosing the portion in a protector. The protector typically has a tubular shape configured by a lid member and a protector main body having a recessed shape in cross-section, and the protector main body and lid member are generally held in a close-lidded state by a snap lock-type lock mechanism.

A known example of this type of conventional protector is a protector in which, for example, an elastic tab with an engagement claw is formed on a side wall of a protector main body and a holding frame is provided integrally with the side wall, the holding frame facing the engagement claw and spanning the elastic tab and slits cut on two sides thereof, whereas a female lock portion is provided to a lid member side, the female lock portion being configured by an engagement frame with a lock hole that is capable of engaging with the engagement claw (see, for example, Patent Literature 1).

Another example is known in which a male lock portion having an elastic tab with an engagement claw and slits cut on two sides thereof is provided to a lid member side, whereas a frame-shaped female lock portion enabling the male lock portion to be inserted therethrough and the engagement claw to engage therewith is provided to a side wall of a protector main body, and a depression capable of accommodating the elastic tab is further formed on the side wall of the protector main body as a clearance structure for the flexure of the elastic tab (see, for example, Patent Literature 2).

RELATED ART

Patent Literature

Patent Literature 1: Japanese Patent Laid-open Publication No. 2012-167736
Patent Literature 2: Japanese Patent Laid-open Publication No. H8-296621

SUMMARY OF THE INVENTION

Problems to be Solved by the Invention

However, in the conventional protectors described above, the female lock portion and holding frame of the lock mechanism formed on an exterior surface of the two side walls of the protector main body each have a top end surface that is even with a top end surface of the side walls, which is a contact surface between the protector main body and the lid member. Moreover, the engagement claw must engage with a crossbeam portion that faces the engagement claw and that spans the elastic tab and the pair of slits on two sides of the elastic tab, or that spans the depression accommodating the elastic tab. Therefore, a vertical direction width of the crossbeam portion is constrained.

In addition, positions where two ends of the crossbeam portion project from the two side walls of the protector main body are adjacent to the pair of slits on two sides of the elastic tab with the engagement claw or to the depression accommodating the elastic tab. Therefore, there is a challenge where a weld line readily forms in the crossbeam portion of the holding frame or frame-shaped female lock portion, and a crack readily develops in the holding frame or the frame-shaped female lock portion in a locked state, on the edge of the weld line. In other words, when molten resin flows into a molding die to mold the protector main body, the molten resin reaches two side wall corners of the side walls of the protector main body, the two side wall corners configuring the pair of slits described above or two side walls of the depression, then the molten resin flows toward the crossbeam portion in the opposite direction through an area around the lock hole while progressively diminishing in cross-sectional area, and the two resin flows gradually cool during this time. When the two resin flows meet, there is a concern that, for example, a thin, film-like solidified layer may have formed on a leading end of the resin flow, and a weld line is likely to be formed.

There is also a challenge where, within the height direction limitation noted above, when the width of the lock hole is increased in a thickness direction of the side wall of the protector main body in order to ensure ease of a task of inserting the male lock portion of the lock mechanism, the projection height on the side wall surface for the holding frame or female lock portion necessarily increases, and reduction in the ease of performing a lid closing task accompanying a locking task in order to make the protector more compact is unavoidable.

The present invention has been conceived in order to resolve such conventional challenges and seeks to provide a protector which is capable of making the protector more compact while also preventing cracks from developing in a lock mechanism between a protector main body and a lid member, and preventing a reduction in ease of performing a lid closing task where the lid member is locked to the protector main body.

Means for Solving the Problems

In order to achieve the above, a protector according to the present invention includes a trough-shaped protector main body having a bottom wall and two side walls; a lid member arranged facing the protector main body so as to make close contact with a top end of the two side walls of the protector main body; and a lock mechanism locking at least one side wall of the two side walls with the lid member in a close-lidded state. The protector main body is provided with a female lock portion having a substantially C-shaped frame that, together with the one side wall, forms a lock hole, and is also provided with a male lock portion having an elastic tab with an engagement claw that is inserted into the lock hole and engaged by the frame. The frame of the female lock portion includes a pair of support portions formed with a pair of base-end-proximate top end surfaces that are continuous with a top end surface of the one side wall, the pair of base-end-proximate top end surfaces being formed at two end sides of the pair of support portions that are supported by the one side wall; a crossbeam portion integrally supported by the pair of support portions, the crossbeam portion being formed with a projecting-end-proximate top end surface that is continuous with the pair of base-end-proximate top end surfaces and positioned toward a projecting end side, where a distance from the one side wall increases, and further upward than the pair of base-end-proximate top end surfaces and the top end surface of the one side wall; and an engagement projection portion projecting downward from the crossbeam portion along the same direction as the projecting-end-proximate top end surface, the engagement projection portion snap-locking the elastic tab with the engagement claw of the male lock portion.

According to this configuration, in order to constrain a projection height of the lock mechanism, even when the lock hole is made narrower in a thickness direction of the side wall of the protector main body, the crossbeam portion, which is inclined such that the projecting-end-proximate top end surface is positioned further upward than the top end surface of the side wall of the protector main body, forms an insertion guide having a cross-section that expands so as to project toward the lid member. Accordingly, an insertion guide performance that equals or exceeds an ordinary lock hole (and further equals or exceeds when the lock mechanism is arranged on both side walls of the protector main body) is ensured with respect to the elastic tab of the male lock portion.

Moreover, when molding the protector, at a top end side of the crossbeam portion, where two resin flows (for the pair of support portions of the frame) flow into the crossbeam portion and mingle, a weld line can be effectively inhibited from forming by, for example, the meeting angle becoming larger, and in turn a resin flow being formed by the newly mingling resin, the new resin flow flowing obliquely downward from the crossbeam portion toward the engagement projection.

The protector according to the present invention can also have a configuration in which the projecting-end-proximate top end surface of the crossbeam portion forms, together with the top end surface on the projecting end side of the pair of support portions, an inclined surface and two ends of the crossbeam portion are supported above the top end surface of at least the one side wall by the pair of support portions.

Effect of the Invention

According to the present invention, a protector can be provided which is capable making the protector more compact while also preventing cracks from developing in a lock mechanism between a protector main body and a lid member, and preventing a reduction in ease of performing a lid closing task where the lid member is locked to the protector main body.

MODE FOR CARRYING OUT THE INVENTION

In the following, an embodiment of the present invention is described with reference to the drawings.

Embodiment

FIGS. 1 to 4 illustrate a protector 10 according to an embodiment of the present invention. The protector 10 according to the present embodiment is configured as a protective member of a wire harness 1 used in an automobile. Specifically, the wire harness 1 according to the present embodiment protects a specific routing section of a wire bundle 20 with the protector 10.

Figure 1:
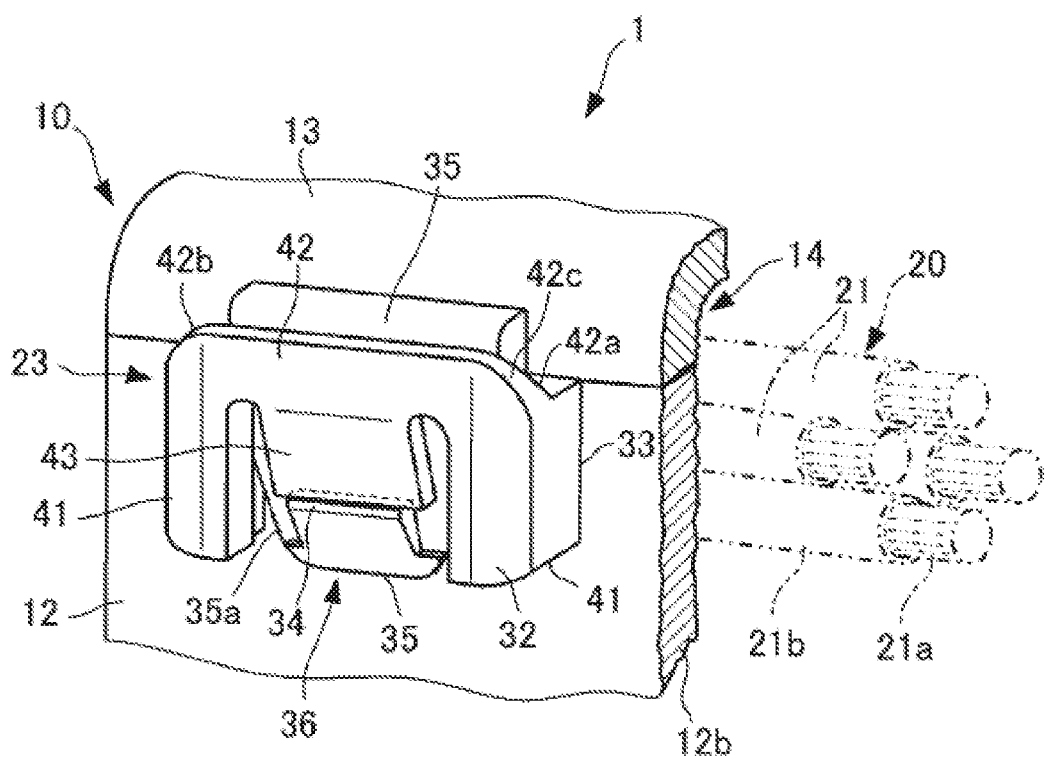
FIG. 1 is a perspective view of a main portion of a protector according to an embodiment of the present invention.
Figure 2:
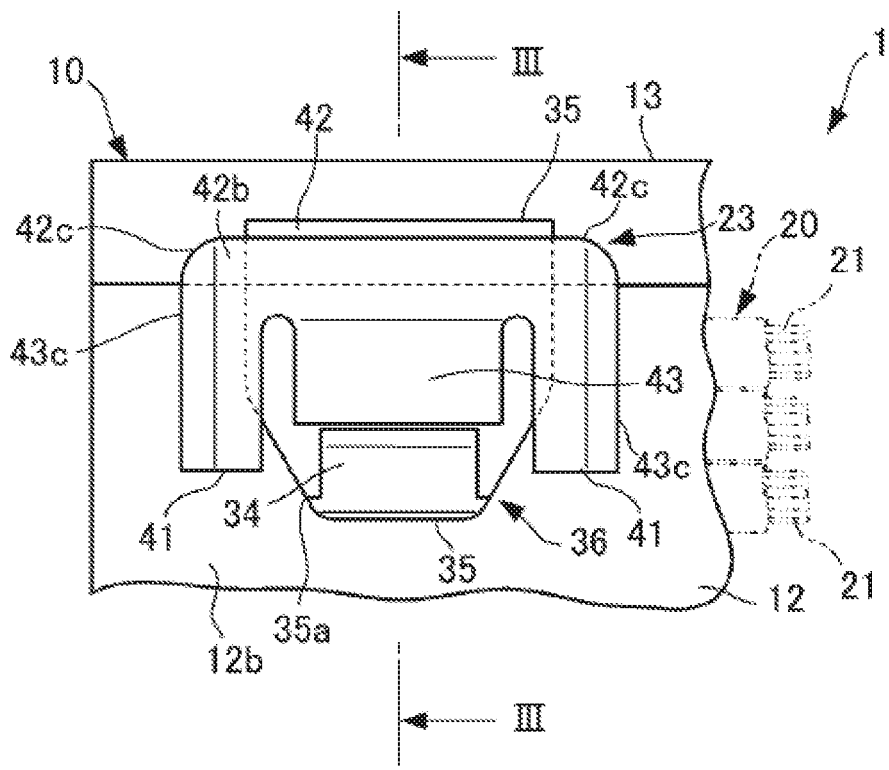
FIG. 2 is a side view of the main portion of the protector according to the embodiment of the present invention.
Figure 3:
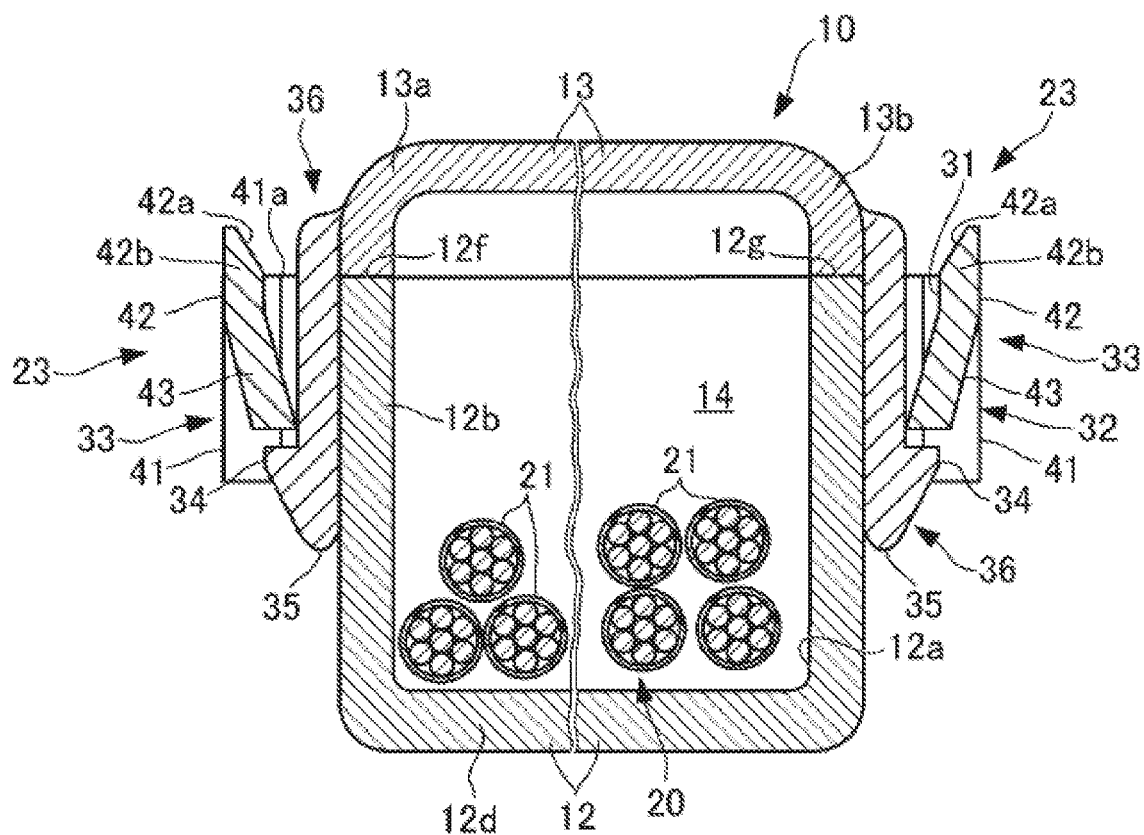
FIG. 3 is a cross-sectional view along an arrow in FIG. 2.

As illustrated in FIGS. 1 to 3, the protector 10 includes a protector main body 12 having a trough shape that forms a depression 12a capable of accommodating the wire bundle 20; and a lid member 13 arranged so as to be capable of opening and closing the protector main body 12 from above in the drawings, which is the direction in which the depression 12a opens.

In a close-lidded state where an open end of the depression 12a is closed off by the lid member 13, the protector main body 12 is configured to form a wire insertion hole 14 that correlates to the depression 12a.

In addition, the protector main body 12 is a member made of resin (synthetic resin) having a predetermined length and forming the depression 12a, which has an overall trench shape. In lateral cross-section, the protector main body 12 has a substantially U-like, recessed shape. The protector main body 12 includes a bottom wall 12d and two side walls 12b and 12c orthogonal to the bottom wall 12d.

The lid member 13 is a recessed body or a plate-shaped body made of resin having a predetermined length that can be supported by the side walls 12b and 12c of the protector main body 12 in the close-lidded state, and is substantially the same width as the protector main body 12. The resin referenced here may be a polypropylene or polyamide resin, for example.

The lid member 13 includes two side ends 13a and 13b which come into close contact with top end surfaces 12f and 12g of the two side walls 12b and 12c of the protector main body 12.

The protector 10 is configured by the protector main body 12 and the lid member 13 to have a squared tube shape having a substantially square or rectangular shape overall in lateral cross-section. The protector main body 12 and the lid member 13 may be integrally connected by a hinge on a side end 13b side, for example, and the protector 10 may of course be formed as a single piece.

The wire bundle 20 is configured to include a plurality of wires (a plurality of coated wires) 21. A conductor 21a of each of the plurality of wires 21 is configured by a circular twisted wire in which a plurality of annealed copper wires are twisted together, for example. A sheath 11b is configured by a cylindrical insulating material made of a resin having polyvinyl chloride, polyethylene, or the like as a primary component, for example.

The wire bundle 20 may be any one of a wire bundle in which the plurality of wires 21, for example, are bundled by insulating tape so as to be separated by predetermined intervals, are roughly wrapped by insulating tape in a spiral pattern, or are loose with a path regulated by the protector 10.

At least one lock mechanism 23, and for example a plurality thereof, locking the lid member 13 in the close-lidded state is provided between the lid member 13 and the two side walls 12b and 12c.

Figure 4:
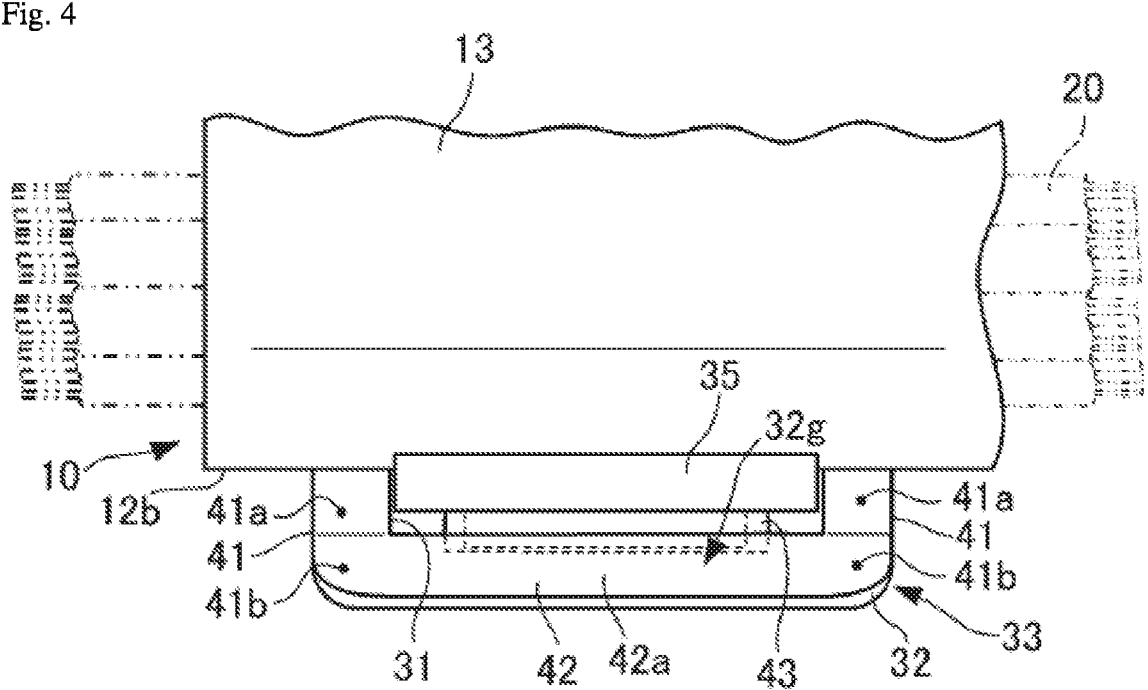
FIG. 4 is a plan view of the main portion of the protector according to the embodiment of the present invention.

Specifically, the protector main body 12 is provided with a female lock portion 33 having a substantially C-shaped frame 32 that, together with at least one side wall 12b, forms a lock hole 31 (see FIGS. 3 and 4). Conversely, the lid member 13 is provided with a male lock portion 36 having an elastic tab 35 with an engagement claw 34 that is inserted into the lock hole 31 and engaged by the frame 32. The lock mechanism 23 is configured by the interlocking female lock portion 33 and male lock portion 36.

The drawings depict the lock mechanism 23 at only one location in an axis direction of the protector 10, but the lock mechanism 23 is arranged at a plurality of locations in the axis direction of the protector 10, and the plurality of lock mechanisms 23 are arranged at approximately equal intervals in a length direction of the protector main body 12.

The frame 32 of each female lock portion 33 includes a pair of support portions 41 projecting from a side wall surface of one of the side walls 12b and 12c; a crossbeam portion 42 integrally supported on two ends by the pair of support portions 41; and an engagement projection portion 43 integrally supported by the crossbeam portion 42.

A pair of base-end-proximate top end surfaces 41a that are continuous with the top end surface 12f of the one side wall 12b are formed on the pair of support portions 41 on, for example, two end sides thereof that are supported by the one side wall 12b (surface portions on both left and right end sides of the frame 32 depicted in FIG. 4, which are supported by the one side wall 12b).

The crossbeam portion 42 is integrally supported at both ends by the pair of support portions 41. A projecting-end-proximate top end surface 42a is formed on the crossbeam portion 42 so as to be continuous with the pair of base-end-proximate top end surfaces 41a and so as to be positioned toward a projecting end side (toward a bottom end side in FIG. 4), where a distance from the one side wall 12b increases, and further upward than the pair of base-end-proximate top end surfaces 41a and the top end surface 12f of the side wall 12b (upward in FIG. 3), the projecting-end-proximate top end surface 42a inclined upward at the projecting end thereof.

A portion within a predetermined height range of the crossbeam portion 42 that is positioned further upward than the base-end-proximate top end surfaces 41a of the support portions 41 and the top end surface 12f of the side wall 12b (that is, a portion 42b within a predetermined height range on a top end side where the projecting-end-proximate top end surface 42a is formed) is hereafter referred to as a top-endward portion 42b.

The engagement projection portion 43 projects from the crossbeam portion 42 along the same direction as the projecting-end-proximate top end surface 42a. In other words, the engagement projection portion 43 projects downward in an inclination direction such that a top end side moves away from the one side wall 12b and a bottom end side approaches the one side wall 12b.

When the elastic tab 35 with the engagement claw 34 of the male lock portion 36 is inserted into the lock hole 31 from a leading edge guide 35a side, the engagement claw 34 of the elastic tab 35 presses the engagement projection portion 43 outward and the engagement projection portion 43 is elastically deformed so as to move away from the one side wall 12b. When the engagement claw 34 of the elastic tab 35 has passed lower than the engagement projection portion 43, the engagement projection portion 43 is restored so as to approach the one side wall 12b and can retain and engage the elastic tab 35.

The width of a leading edge of the leading edge guide 35a in a wall surface direction of the one side wall 12b is somewhat smaller than the length of the lock hole 31 in the same direction. The width direction centers of the elastic tab 35 and the lock hole 31 in that direction are set at the same position.

The projecting-end-proximate top end surface 42a of the crossbeam portion 42, together with an inclined surface 41b on the projecting end side of the pair of support portions 41, forms an inclined surface 32g that is broader than the leading edge of the leading edge guide 35a in the wall surface direction of the side wall 12b.

In addition, the crossbeam portion 42 is supported above at least the top end surface 12f of the one side wall 12b by the pair of support portions 41. As illustrated in FIG. 2, top surfaces 42c on both end portions of the crossbeam portion 42, which are integral with the top end portions of the pair of support portions 41, are curved at a fixed curvature radius while inclining obliquely downward such that the top surfaces 42c are continuous with an exterior surface 41c of the pair of support portions 41.

Such a shape for the crossbeam portion 42 provides a "leading" structure by including the inclined surface 32g, which can act as a guide surface when inserting the male lock portion 36. Moreover, such a shape provides a molding die site for the frame 32 during injection molding of the protector main body 12 with a structure where a resin flow flowing from the pair of support portions 41 into the crossbeam portion 42 readily flows into a height range above the top end surface 12f of the one side wall 12b.

In the present embodiment, of the upper and lower recessed bodies configuring the protector 10, a side which houses the wire bundle 20 in an open-lidded state is called the protector main body 12. The female lock portion 33 of the lock mechanism 23 is arranged on the protector main body 12 side, and the male lock portion 36 is arranged on the lid member 13 side. However, when contact surfaces of the protector main body 12 and the lid member 13 differ between the vicinity of the lock mechanism 23 and other sections along the wire length, the arrangement of the female lock portion 33 and male lock portion 36 of the lock mechanism 23 may be inverted. In the present invention, regardless of the circumstance, the side where the female lock portion of the lock mechanism is formed is called the protector main body and the side where the male lock portion of the lock mechanism is formed is called the lid member.

Next, effects of the present invention are described.

In the protector 10 according to the present embodiment, configured as described above, the crossbeam portion 42 inclines such that the projecting-end-proximate top end surface 42a is positioned further upward than the top end surface 12f of the side wall 12b of the protector main body 12. The cross-section of the crossbeam portion 42 expands so as to project toward the lid member 13 and forms an insertion guide, which provides a broad region capable of leading above the lock hole 31.

Accordingly, in order to constrain a projection height of the lock mechanism 23 on the wall surface of one of the side walls 12b and 12c, for example the one side wall 12b, even when the lock hole 31 is made narrower in a thickness direction of the side wall 12b of the protector main body 12, an insertion guide performance that equals or exceeds an ordinary lock hole can be achieved with respect to the elastic tab 35 of the male lock portion 36.

In particular, as illustrated in FIG. 3, when the lock mechanism 23 is provided respectively on both side walls 12b and 12c of the protector main body 12, it then becomes possible to lead the male lock portion 36 from both sides of the lid member 13. Therefore, an elevated insertion guide performance is ensured and a coupling task, where the lid member 13 engages with the protector main body 12, can be broadly facilitated when locking a plurality of lock mechanisms 23.

Moreover, when molding the protector 10, at a top-endward portion 42b of the crossbeam portion 42, where two resin flows (for the pair of support portions 41 of the frame 32) flow into the crossbeam portion 42 and mingle, a weld line can be effectively inhibited from forming by, for example, the meeting angle of the two resin flows becoming larger, and in turn a resin flow being formed by the newly mingling resin, the new resin flow flowing obliquely downward from the crossbeam portion 42 toward the engagement projection portion 43.

In particular, the side walls 12b and 12c of the protector main body 12 do not require a notch analogous to the slits or depression of Patent Literatures 1 and 2 noted above, and there is no need to provide a corner portion on two side walls (both side walls). Therefore, in this respect also, a weld line is less likely to form.

Accordingly, the walls of the frame 32 can be made thinner. For example, with the side walls 12b and 12c of the protector main body 12 having a thickness of approximately 1.5 mm, the thickness of the crossbeam portion 42 of the frame 32 can be set to between approximately 1.1 and 1.3 mm (for example, 1.2 mm), and by reducing the thickness of the elastic tab 35 (except for the engagement claw 34), the protector 10 can be effectively made more compact. In addition, the top end surface of the crossbeam portion 42 does not jut above the top end of the lid member 13, and also does not jut greatly above the top end of the elastic tab 35, and therefore does not adversely affect other tasks.

Furthermore, in the present embodiment, the projecting-end-proximate top end surface 42a of the crossbeam portion 42, together with the inclined surfaces 41b on the projecting end side of the pair of support portions 41, forms the broad inclined surface 32g, and the two ends of the crossbeam portion 42 are supported above at least the top end surface 12f of the one side wall 12b by the pair of support portions 41. Therefore, the resin flow from the direction of the pair of support portions 41 can be made to flow favorably into the top-endward portion 42b of the crossbeam portion 42, and the formation of a weld line can be more effectively inhibited.

In this way, according to the present invention, the projection height on the wall surface of one of the side walls 12b and 12c of the protector main body 12 can be inhibited for the frame 32 and the elastic tab 35 with the engagement claw 34, and even when attempting to make the protector 10 more compact, a protector 10 can be provided which is capable of reliably preventing cracks from developing in the lock mechanism 23 between the protector main body 12 and the lid member 13, and which is capable of reliably preventing a reduction in ease of performing a lid closing task where the lid member 13 is locked to the protector main body 12.

Comparative Example

Figure 5:
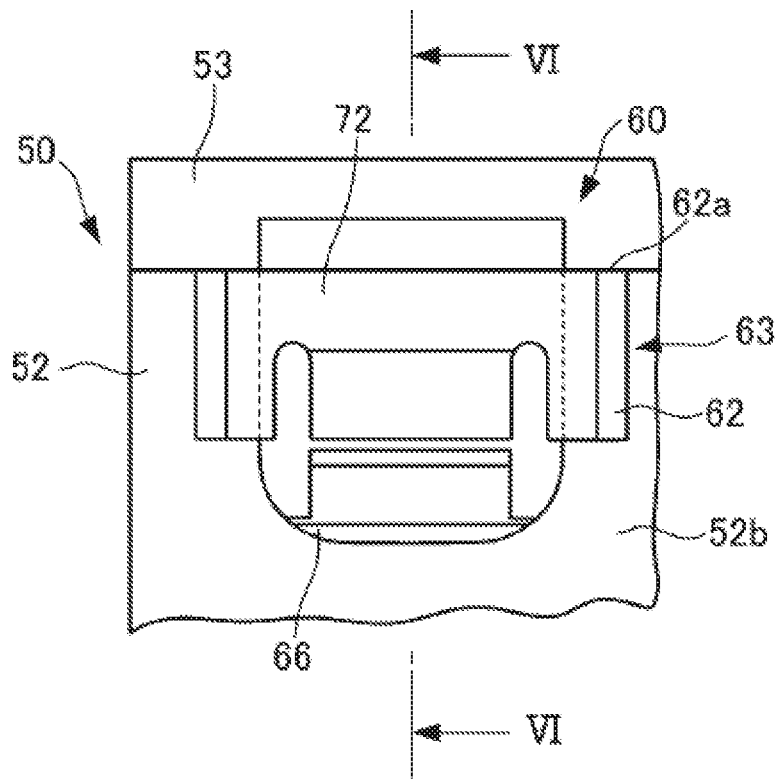
FIG. 5 is a side view of a main portion of a protector according to a comparative example.
Figure 6:
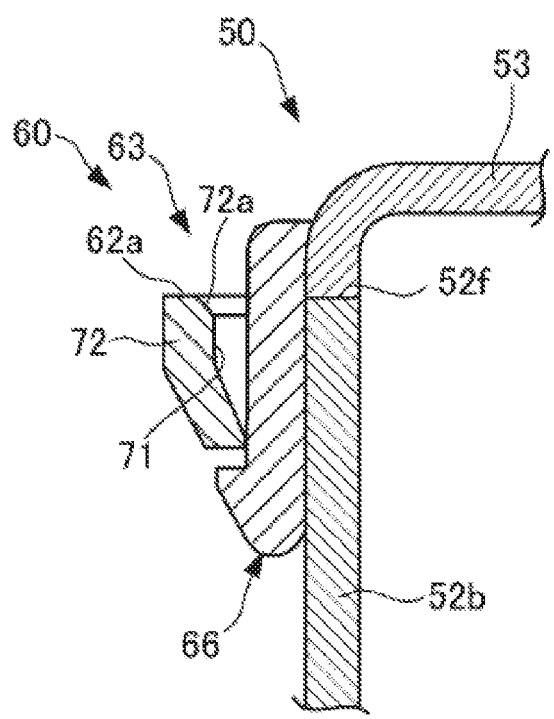
FIG. 6 is a cross-sectional view along an arrow VI-VI in FIG. 5.

FIGS. 5 and 6 illustrate a protector 50 according to a comparative example.

The protector 50 has no portion equivalent to the top-endward portion 42b of the crossbeam portion 42 according to the embodiment and instead, similar to the conventional art, has a lock mechanism 63 arranged on a side wall 52b of a protector main body 52 and on an exterior surface side of the lid member 53.

A substantially C-shaped frame 62 in a female lock portion 63 of the lock mechanism 63 includes a top end surface 62a that is the same height as a top end surface 52f of the side wall 52b, which is the contact surface between the protector main body 52 and the lid member 53.

In this case, an insertion guide surface 72a of the male lock portion 66 cannot be adequately formed above a crossbeam portion 72, and a leading effect cannot be achieved. Therefore, a width of a lock hole 71 and a thickness of the crossbeam portion 72 of the frame 62 in a thickness direction (left/right direction in FIG. 6) of the side wall 52b can be somewhat increased.

Specifically, with the side wall 52b of the protector main body 52 set to a thickness of 1.5 mm, and a thickness width of the crossbeam portion 72 of the frame 62 set to 1.5 mm, the width of the lock hole 71 in the thickness direction of the side wall 52b is increased approximately 1.5 times relative to the lock hole 31 in the embodiment, and in conjunction, the thickness of the male lock portion 66 is also increased by the same factor.

With the configuration of the comparative example, when the projection height on the wall surface of the side wall 52b is constrained for the lock mechanism 63, the ease of the coupling task when locking the lock mechanism 63 is reduced, and the protector 50 is not readily made more compact.

In the embodiment described above, such issues are resolved.

In this way, in the present embodiment, the protector 10 can be provided capable of preventing cracks caused by weld lines or the like while improving the ease of locking a lid member onto a protector main body, and capable of being made more compact.

Moreover, in the embodiment described above, a case is described where the lock mechanism 23 between the protector main body 12 and the lid member 13 is provided on one of the side walls 12b and 12c, for example on the side wall 12b. However, of course the lock mechanism 23 can be provided between the lid member 13 and each of the side walls 12b and 12c, or a plurality of lock mechanisms 23 can be arranged on each of the side walls 12b and 12c. In addition, the shapes of the protector main body 12 and the lid member 13 may also be bent or partially curved, within a range enabling normal coupling and engagement of the female lock portion 33 and the male lock portion 36 of the lock mechanism 23.

As described above, the present invention is capable of providing a protector that can prevent cracks in a lock mechanism and can prevent a reduction in the ease of a lid closing task where a lid member is locked, while making the protector more compact. The present invention is useful with all protectors configured to have a lid member engage with a protector main body that includes a depression housing wires.

INDUSTRIAL APPLICABILITY

1 Wire harness
10 Protector
11b Sheath
12 Protector main body

12*a* Depression
12*b*, 12*c* Side wall
12*d* Bottom wall
12*f*, 12*g* Top end surface
13 Lid member
13*a*, 13*b* Side end
14 Wire insertion hole
20 Wire bundle
21 Wire
21*a* Conductor
23 Lock mechanism
31 Lock hole
32 Frame
32*g* Inclined surface
33 Female lock portion
34 Engagement claw
35 Elastic tab
35*a* Leading edge guide
36 Male lock portion
41 Support portion
41*a* Base-end-proximate top end surface
41*b* Projecting-end-proximate inclined surface
41*c* Exterior surface
42 Crossbeam portion
42*a* Projecting-end-proximate top end surface
42*b* Top-endward portion
42*c* Top surface
43 Engagement projection portion

What is claimed is:

1. A protector comprising:
a protector main body having a bottom wall and two side walls, the protector main body forming a depression; and
a lid member to close off an open end of the depression, wherein
the lid member includes a male lock portion having an elastic tab with an engagement claw,
the protector main body includes a female lock portion having a frame on at least one side wall of the two side walls, the frame engaging with the engagement claw,
the frame of the female lock portion includes:
a pair of support portions formed with a pair of base-end-proximate top end surfaces that are continuous with a top end surface of the one side wall;
a crossbeam portion integrally supported by the pair of support portions, the crossbeam portion being formed with a projecting-end-proximate top end surface that is continuous with the pair of base-end-proximate top end surfaces; and
an engagement projection portion projecting downward from the crossbeam portion, the engagement projection portion locking the elastic tab with the engagement claw of the male lock portion,
the projecting-end-proximate top end surface is positioned further upward than the pair of base-end-proximate top end surfaces and the top end surface of the side wall of the protector main body, and
the projecting-end-proximate top end surface and the engagement projection portion move away from the one side wall on a top end side while approaching the one side wall on a bottom end side, the top end side the bottom end side.

* * * * *